United States Patent
Canoso et al.

(10) Patent No.: US 9,535,421 B1
(45) Date of Patent: Jan. 3, 2017

(54) MOBILE DELIVERY ROBOT WITH INTERIOR CARGO SPACE

(71) Applicant: Savioke, Inc., Santa Clara, CA (US)

(72) Inventors: Adrian Canoso, Menlo Park, CA (US); Jonathan Binney, Sunnyvale, CA (US); Chad Rockey, San Bruno, CA (US)

(73) Assignee: Savioke, Inc., San Jose, CA (US)

(*) Notice: Subject to any disclaimer, the term of this patent is extended or adjusted under 35 U.S.C. 154(b) by 0 days.

(21) Appl. No.: 14/636,084

(22) Filed: Mar. 2, 2015

Related U.S. Application Data

(60) Provisional application No. 61/946,631, filed on Feb. 28, 2014.

(51) Int. Cl.
*B25J 5/00* (2006.01)
*B25J 19/02* (2006.01)
*G05D 1/02* (2006.01)
*B25J 11/00* (2006.01)

(52) U.S. Cl.
CPC ............. *G05D 1/0214* (2013.01); *B25J 5/007* (2013.01); *B25J 11/008* (2013.01); *Y10S 901/01* (2013.01)

(58) Field of Classification Search
CPC ....... G05D 1/0214; B25J 5/007; B25J 11/008; Y10S 901/01
USPC ................. 901/1; 382/568.12; 701/23-28
See application file for complete search history.

(56) References Cited

U.S. PATENT DOCUMENTS

| | | | |
|---|---|---|---|
| 6,374,155 B1* | 4/2002 | Wallach | G05D 1/0295 700/245 |
| 6,517,429 B1* | 2/2003 | O'Connell | B25J 21/02 454/56 |
| D663,334 S * | 7/2012 | Kitano | D15/199 |
| 2001/0031604 A1* | 10/2001 | Hornsby | A63H 33/00 446/427 |
| 2002/0198626 A1* | 12/2002 | Imai | G06N 3/008 700/245 |
| 2003/0165373 A1* | 9/2003 | Felder | B23Q 7/1442 414/331.07 |
| 2004/0015266 A1* | 1/2004 | Skoog | B25J 5/007 700/245 |
| 2004/0027086 A1* | 2/2004 | Ogawa | B25J 19/005 318/568.12 |
| 2004/0042884 A1* | 3/2004 | Jester | A63B 47/021 414/501 |

(Continued)

FOREIGN PATENT DOCUMENTS

JP 11016057 A * 1/1999

OTHER PUBLICATIONS

"Healthcare Solutions—Autonomous Mobile Robot (AMR) RoboCourier™." Swisslog.com. Swisslog Healthcare Solutions, 2011. Web. Jan. 9, 2016. <http://ww1.prweb.com/prfiles/2012/05/15/9512424/AMR Overview.pdf>.*

(Continued)

*Primary Examiner* — Dale Moyer

(57) ABSTRACT

A mobile robot can include an elongated body disposed in a vertical direction and having an approximately cylindrical shape; a user interface within an upper 20 centimeters of the body and inclined to be accessible from above and in front of the robot; at least one depth sensor that is mounted at or near a top of the body and having at least one field of view; at least one container formed within the body; and a drive mechanism disposed within the body.

19 Claims, 10 Drawing Sheets

(56) References Cited

U.S. PATENT DOCUMENTS

| | | | |
|---|---|---|---|
| 2004/0093650 A1* | 5/2004 | Martins | B25J 5/007 180/167 |
| 2005/0029029 A1* | 2/2005 | Thorne | G05D 1/0242 180/167 |
| 2005/0192721 A1* | 9/2005 | Jouppi | G05D 1/0011 701/24 |
| 2005/0216126 A1* | 9/2005 | Koselka | B25J 5/007 700/259 |
| 2006/0012673 A1* | 1/2006 | Koselka | H04N 13/0239 348/42 |
| 2007/0112461 A1* | 5/2007 | Zini | G05B 19/41895 700/245 |
| 2008/0140253 A1* | 6/2008 | Brown | B65F 1/1473 700/245 |
| 2008/0277391 A1* | 11/2008 | Ciccaglione | B66F 9/063 220/1.5 |
| 2012/0185095 A1* | 7/2012 | Rosenstein | B25J 5/007 700/259 |
| 2012/0283905 A1* | 11/2012 | Nakano | G05D 1/0214 701/25 |
| 2013/0226344 A1* | 8/2013 | Wong | G05D 1/024 700/258 |
| 2014/0136414 A1* | 5/2014 | Abhyanker | G06Q 50/28 705/44 |
| 2014/0333190 A1* | 11/2014 | Kim | B62B 5/0076 312/400 |
| 2014/0350725 A1* | 11/2014 | LaFary | G06N 3/008 700/253 |
| 2015/0094879 A1* | 4/2015 | Pari | G05D 1/0276 701/2 |
| 2015/0242806 A1* | 8/2015 | Cousins | G05D 1/0231 700/237 |
| 2015/0253777 A1* | 9/2015 | Binney | G05D 1/0214 701/28 |
| 2015/0307273 A1* | 10/2015 | Lyman | G01G 19/08 705/7.13 |

OTHER PUBLICATIONS

Murai, Ryosuke, et al. "Conveyance system using autonomous mobile robots." Advanced Robotics and its Social Impacts (ARSO), 2009 IEEE Workshop on. IEEE, 2009.*

"RoboCourier™ Enhanced Sensor, Autonomous Platform." CCS Robotics. Apr. 4, 2009. Web. Jan. 8, 2016. [http://www.ccsrobotics.com/products/robocourier.html].__Internet Archive__. [https://web.archive.org/web/20090404082509/http://www.ccsrobotics.com/products/robocourier.html].*

"Swisslog Applications—Automated Materials Transport Solutions for Hospital Pharmacies." Swisslog.com. Swisslog Healthcare Solutions, 2012. Web. Jan. 8, 2016. <http://www.swisslog.com/-/media/Swisslog/Documents/HCS/Hospital_Departments/Pharmacy/AMTS_400_AMTS_Pharmacy_Solutions.pdf>.*

Swisslog. (2010). Healthcare Solutions, Autonomous Mobile Robot (AMR) [Brochure].*

* cited by examiner

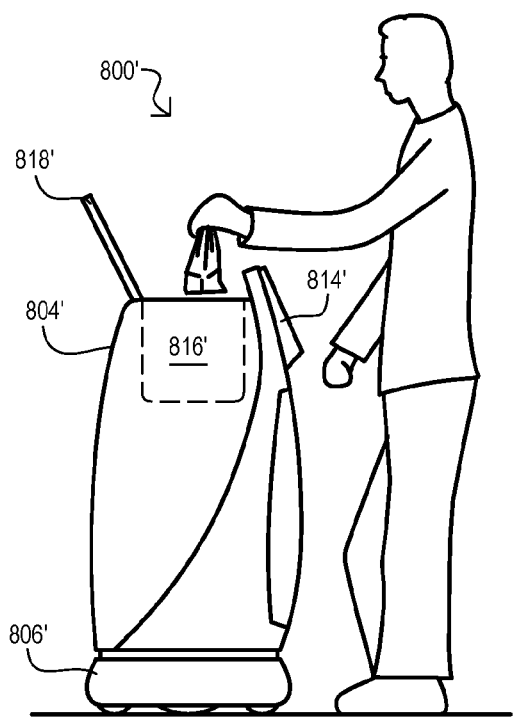
FIG. 8B
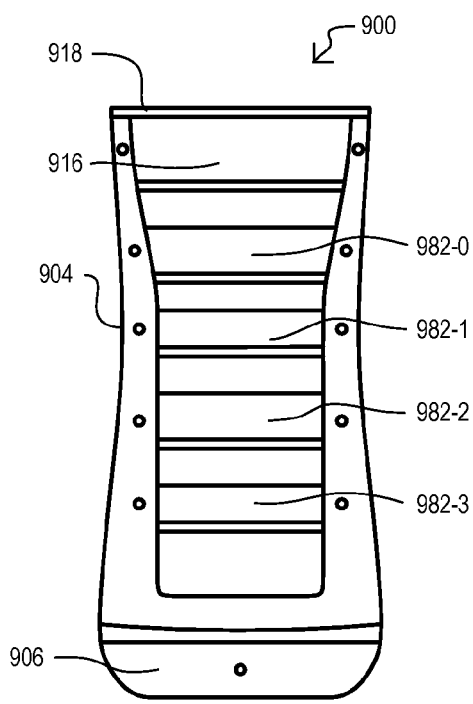
FIG. 9
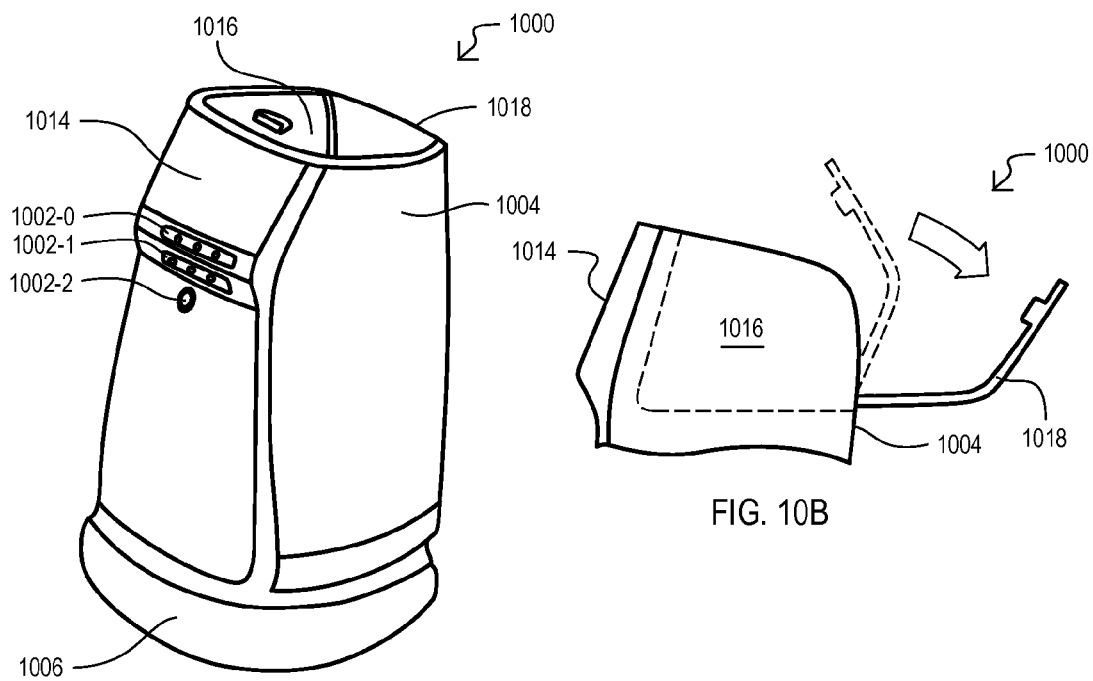
FIG. 10A
FIG. 10B

MOBILE DELIVERY ROBOT WITH INTERIOR CARGO SPACE

CROSS-REFERENCE TO RELATED APPLICATIONS

This application claims the benefit of U.S. Provisional Patent Application Ser. No. 61/946,631 filed on Feb. 28, 2014, the contents of which are incorporated by reference herein.

TECHNICAL FIELD

The present disclosure relates generally to mobile robots, and more particularly to robots having cargo containers for holding objects for delivery from one location to another.

BACKGROUND

Effective and reliable robotic delivery systems for handling intermittent, on-demand, or scheduled deliveries of items in a wide variety of environments are needed. Ideally, delivery robots should be able to securely carry objects and remain stable while moving, and have a configuration that prevents object damage or loss.

Robotic forklifts or pallet trucks have been used to move objects. However, such robotic systems are typically limited to factories or warehouses that support a highly structured environment, requiring the use of designated trackways, or having preset physical or electronic guides throughout a building infrastructure to facilitate robot movement without interruption. Such conventional robots can use a minimal set of sensors because obstacle avoidance can be limited to stopping the robot when a mechanical or ultrasonic sensor indicates blocking of the designated trackway until a pathway is cleared.

However, in more complicated environments such as hospitals, hotels, conference facilities, residential facilities, or the like, more sophisticated sensors capable of supporting autonomous navigation are needed. Such sensors can be used to identify and localize absolute or relative position, create maps through simultaneous localization and mapping (SLAM), and detect obstacles such as walls or movable objects. Obstacle detection is particularly important for avoiding unwanted collisions with fast moving vehicles, humans, animals, or even other robots.

Conventional obstacle avoidance commonly relies on long-distance rangefinders that actively scan the environment using laser, infrared, or sonar beams. While such active range finding sensor systems can provide highly accurate centimeter scale position data on millisecond timescales, they are relatively expensive. For example, laser-based sensors with a wide field of view (up to 270°) can sense stationary or moving obstacles up to 30 meters away by projecting a long-range laser beam and scanning it to bounce off any obstacles in order to detect the distance to the closest obstacle along that beam's path. This effectively delivers a view of obstacles in a 270° field of view around the sensor, and provides mapping and/or obstacle avoidance data that can be used by a robot operating system software (ROS), such as that provided by the Open Source Robotics Foundation.

Unfortunately, such sensors are costly and can be difficult to mount and position in a delivery robot. Since sensor systems are a significant component in a robot bill of materials, providing low cost commercial delivery robots depends at least in part upon use of low cost robot sensor systems that are effective, rugged, and simple to calibrate and assemble.

BRIEF DESCRIPTION OF THE DRAWINGS

FIGS. 8A and 8B are diagrams showing robots having a touchpad interface and a top loading cargo bay according to embodiments;

FIG. 9 is a rear view of a robot having multiple rear containers according to an embodiment;

DETAILED DESCRIPTION

Embodiments can include robots having one or more containers for delivering objects, where the robots are designed for stability and can operate in environments having assorted obstacles, both moving and stationary. Corresponding methods are also shown. Containers can be formed within a robot body and can secure objects for delivery, as well as take various forms and configurations. A user interface structure for such robots can be positioned for ease of access by people, while at the same time contributing to robot stability by being angled toward a centerline of the robot.

Figure 1:
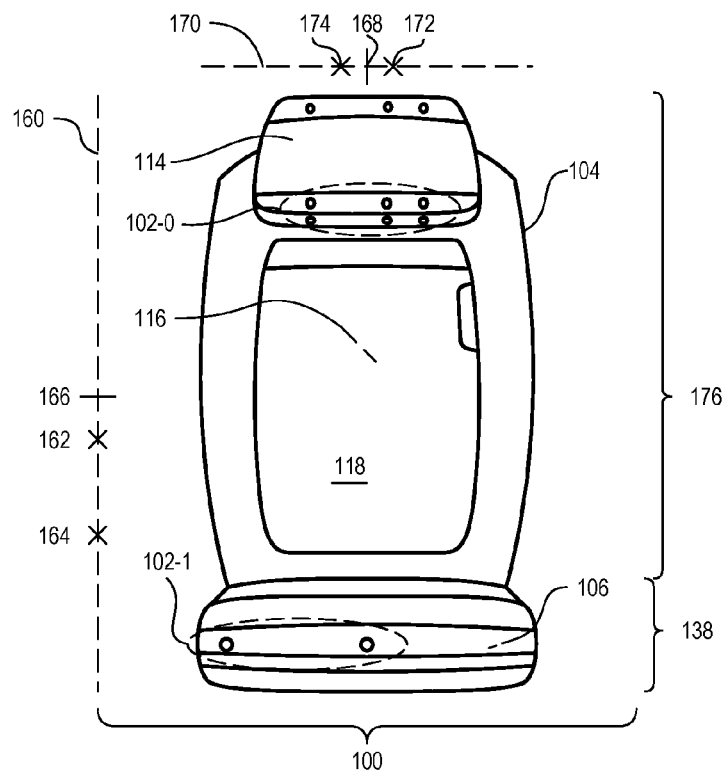
FIG. 1 is a diagram showing a robot with interior cargo space and a low center of gravity, both when empty and filled with cargo, according to an embodiment.

FIG. 1 is a front view of a delivery robot 100 according to one embodiment. A robot 100 can include a body 104 having an elongated shape with a container (e.g., cargo space) 116 formed therein. A robot 100 can include sensors for navigating in an environment. In the embodiment shown, robot 100 includes top mounted sensors 102-0 and bottom mounted sensors 102-1, as well as a user interface 114 and movement system 106 formed within a base 138 of body 104.

A robot 100 can have a low center of gravity for stability when both loaded and unloaded. A low center of gravity can be a center of gravity lower than a vertical midpoint of a robot 100. For example, line 160 of FIG. 1 represents the vertical extents of robot 100, and position 166 shows a vertical midpoint. In some embodiments, a center of gravity in an unloaded robot 100 can be in a lower 30% of a robot's height, as represented by position 164. Still further, in some embodiments, even when loaded, a robot 100 can have a low center of gravity. For example, for loads having a weight up to that of the robot, a center of gravity can remain in a lower 45% of the robot height, as represented by position 162.

In a similar fashion, a robot center of gravity can be centrally located in a lateral direction. For example, line 170 represents the lateral (horizontal) extents of robot 100, and position 168 shows a lateral midpoint. In some embodiments, a center of gravity in an unloaded robot 100 can be within 20% of a robot's lateral midpoint 168. This is represented by positions 172 and 174.

Drive propulsion, battery systems, and at least some portion of the control electronics can be positioned in a base 138 that is connected to and supports a roughly cylindrical cargo carrying portion 176 of the body 104. A base 138 can be a modular component of the delivery robot 100, with various types of cargo carrying casings preferentially mounted for differing applications or delivery needs.

A container 116 (or removable cargo containers, not shown) can be securable, including lockable, and arranged for easy access by a user. While FIG. 1 shows a container 116 accessible via a door 118 formed in a front of robot, it is understood that embodiments can include containers accessible via a side of the robot, a back of the robot, a top of the robot, or combinations thereof. According to embodiments, containers can maximize an internal space of a body 104. In the embodiment shown, a container 116 can occupy a majority of the total height of the robot, as well as the majority of the cargo carrying portion 176.

In certain embodiments, any of sensors 102-0/1 can include position, depth or similar sensor systems. As noted above, sensors 102-0/1 can be mounted on or near the top of the robot, as well as on the base, or both.

In particular embodiments, a user interface 114 can be a touchpad or similar device, which can be accessed by a user (not shown) to interface with the robot 100.

In this way, a delivery robot 100 can be designed for stability when stationary or moving, resistance to fall-over or tipping, and can maximize interior cargo space for a given body volume. As shown herein, in particular applications, a delivery robot can autonomously navigate through changeable indoor or outdoor environments, including but not limited to hotels, convention centers, medical or care centers, indoor or outdoor restaurants, open air city plazas, or the like.

Figure 2A:
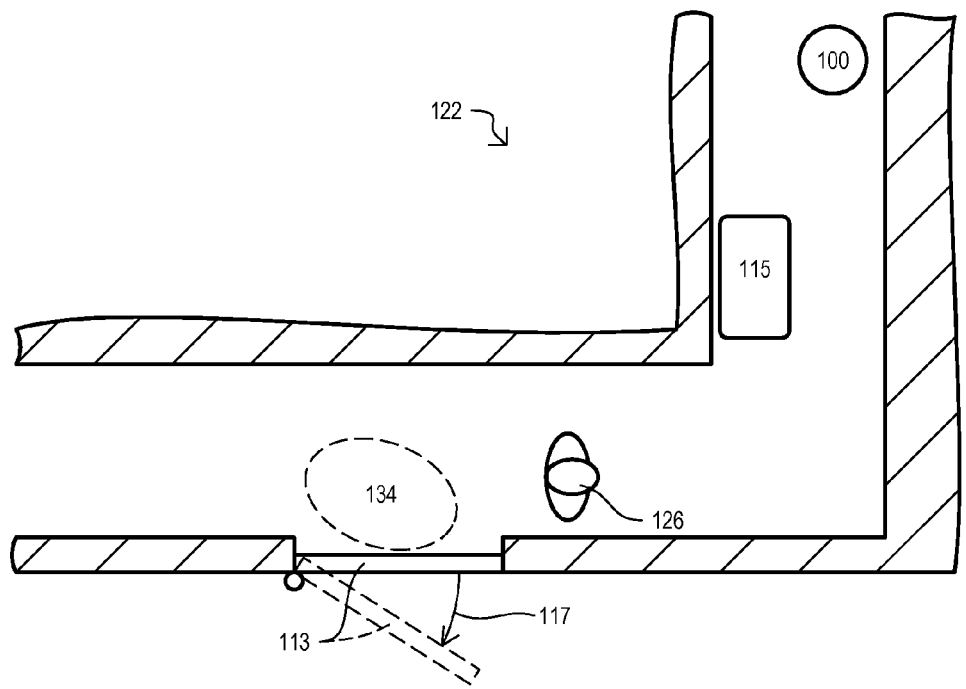
FIGS. 2A to 2C are diagrams showing various operations of robots according to embodiments.
Figure 2B:
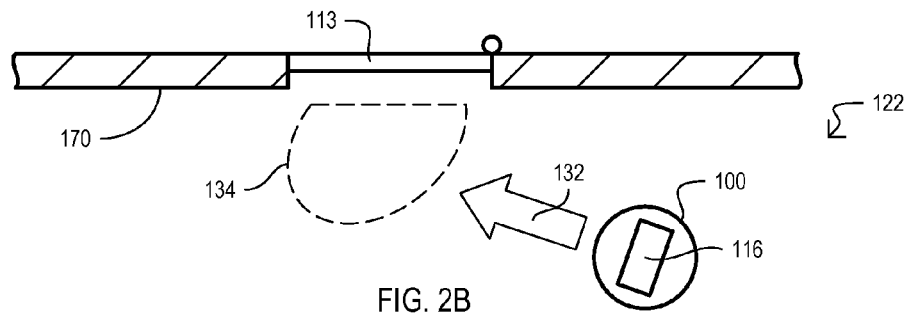
Figure 2C:
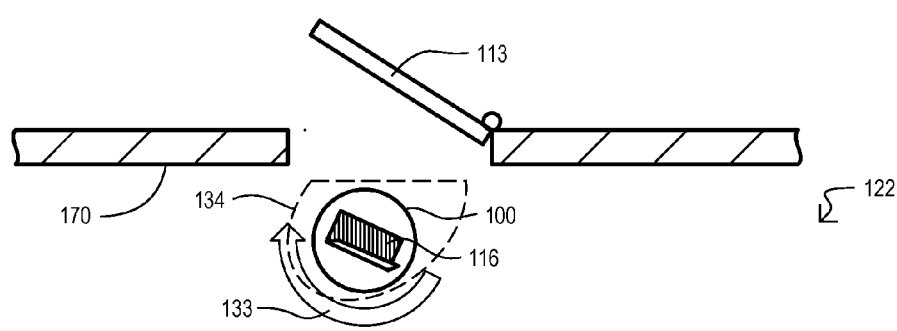

FIGS. 2A, 2B and 2C are a series of top-down looking cartoon views showing movement of a robot through an area containing obstacles to a delivery zone, as well as the opening of a container to complete delivery, according to embodiments.

In some embodiments, a robot containing item(s) for delivery can evade stationary and moving obstacles to reach a delivery zone. In the embodiment of FIG. 2A, a robot 100 can navigate through a hallway 122 (i.e., an environment) with various obstacles to a delivery zone 134 positioned adjacent to a door 113. Such an operation can include the robot 100 maneuvering through a hallway 122, navigating to evade obstacles such as a cart 115 and a person 126, in order to position itself in a destination zone 134 in front of a doorway 113. FIG. 2A shows a destination zone suitable for an inwardly opening door 113, as indicated by door open angle 117.

In some embodiments, features at a delivery location can be used to identify and/or confirm a delivery zone. In the embodiment of FIG. 2B, a robot 100 can maneuver to a delivery zone 134 adjacent to a door 113. As seen in FIG. 2B, a hallway 122 (i.e., environment) can be bounded on one side by a wall 170 having a door 113 into a room. A robot 100 having a secured container 116 can autonomously navigate in a direction indicate by arrow 132 to a delivery zone 134 outlined by dotted lines, with the delivery zone 134 being in front and slightly to the side of the door 113.

In some embodiments, a robot can arrive at a delivery zone and enable delivered item(s) to be retrieved. In particular embodiments, a robot can orient itself in a predetermined fashion to provide easy access to the item(s). In the embodiment of FIG. 2C, once a robot has arrived at delivery zone 134 adjacent to the door 113 corresponding to the ordering guest's room, a robot 100 can complete delivery upon door 113 opening. In some embodiments this can include unlocking container 116. In a particular embodiment, a robot 100 can navigate to the delivery zone 134 and rotate in place (indicated by arrow 133) to present the container 116 in a position easily retrievable by the guest. When the door 113 opens, the robot 100 can complete authentication (using the opening of the pre-selected door as a portion of the authentication process) and allow pickup of the item(s) resting in the container 116 by the guest. In some embodiments, this can include unlocking and/or opening a lid of the container 116.

While embodiments show a delivery zone that is relative to a door in a hotel, any suitable location can serve as a delivery zone. For example, delivery zones can include, but are not limited to: an entryway or threshold area, a defined location, a designated restaurant table, a guest occupied reception or meeting room chair, or a poolside lounge. Still further, a biometrically identified guest can serve as, or be used to derive, a delivery zone.

While embodiments show a robot delivering items to a guest, delivery can be for any other suitable task. For example, a robot can be used to deliver cleaning supplies or materials to carts of cleaning staff, while in other embodiments robots can deliver items to other robots for later pickup.

To identify a delivery zone or assist in the identification of a delivery zone, a robot can use image sensors, depth sensors, position sensors, or the like. The sensors can be used to identify room numbers and determine if opening of a door has occurred. Active or passive identification systems can be used, including but not limited to RFID tags, Bluetooth beacons, QR coded markings, ultrasonic emitters, or other suitable area or target identification mechanism or marking system. While such sensors can be mounted on the robot itself, in some embodiments, all or a portion of the sensors can be separate from the robot, but can transmit sensor data to the robot, or have such data be retrieved by the robot.

In one operational embodiment for determining the designated delivery zone and assisting in authentication, a robot can use a precomputed (if door sizes are standardized) or locally determined three dimensional (3D) door opening model. For example, once a robot 100 is localized in front of a door, it can detect the state of the door (open or closed)

by using depth or other suitable 3D sensors to measure door dimensions and position. Typically, a door is positioned on a plane that is perpendicular to the floor, and rotates on hinges. As the door opens and closes, it sweeps out an arc along the floor. The 3D sensor data is fit to this model of the door and its surrounding walls. By comparing the orientation of the sensed door plane to the detected walls and the map, the robot estimates the angle of the door, determines whether it is in an open or closed state, and can determine whether or not the door opening will contact the robot. The robot can use the model to position itself in a position that allows for ease of delivery, while preventing contact with the opening door. In certain embodiments the robot can position itself in a non-blocking position to allow entry or exit of guests through the doorway even during delivery.

In some building types, such as hotels, doors are normally locked and often open inward. A person present in the room, or a person who can open the door has been authenticated to a certain extent by the hotel. For hotel delivery of inexpensive items, this level of authentication can be sufficient for many applications. In practice, the robot may be programmed to unlock a bin or cargo carrier so that a person can remove its load once the robot detects that the door is open. Individual hotels or institutions can augment this authentication technique with others if needed, such as asking the person receiving the delivery to sign on a tablet, by use of a tablet mediated video interface with a hotel employee, detection of a guest key card with RFID or magnetic strip, personal identification number (PIN) generated for a guest at check-in, or other suitable means. More advanced biometric techniques including but not limited to fingerprint, voice analysis, or facial image identification can also be used.

In some embodiments, removal of a delivered item can be presumed, and the lid automatically closed and relocked. In other embodiments, active measures can be utilized to confirm the item(s) have been removed, including but not limited to weight or pressure sensors, RFID tags, imaging, ultrasonic sensors.

As will be appreciated, various procedures can be used for deliveries. For example, in some embodiments, one or more types of delivery may not require a locked container, with the robot simply being loaded with an item and autonomously maneuvering to a delivery zone, authenticating (i.e., detecting when the door opens), and the item(s) can be presented for delivery.

In another delivery procedure, an item(s) can be placed in lockable container inside or to one side (e.g., rear) of a robot, where the robot can maneuver to a delivery zone (e.g., door), authenticate (e.g., interact with a guest), and rotate to present a side or rear container holding item(s) for delivery.

Having described robots and corresponding operations according to various embodiments, other methods of operation for a robot according to embodiments will now be described.

Figure 3:
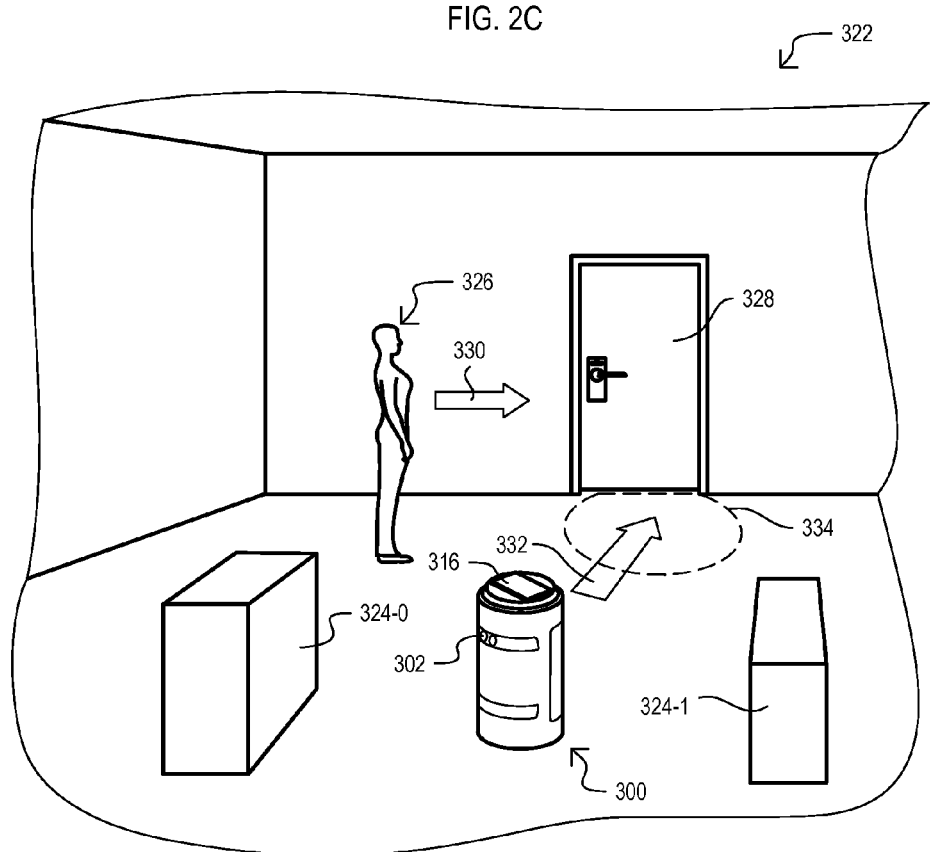
FIG. 3 is a cartoon illustrating a robot according to an embodiment maneuvering in an indoor environment such as a hallway with a door.

As seen in the cartoon illustration of FIG. 3, a robot 300 can move in an environment 322 such as a hallway or room, even in the presence of potentially blocking objects or people moving through the area. In particular embodiments, a robot 300 can be any of those described herein, or equivalents. A robot 300 can be autonomously movable in an environment 322 that can include multiple fixed objects 324-0 and 324-1, as well as one or more movable objects 326, such as person moving toward a door 328 in a direction indicated by arrow 330.

In addition to translational movement along a floor of the environment 322, a robot 300 can rotate through 360° permitting environment scanning with one or more sensors 302 fixedly mounted or having a limited movement. A sensor 302 can include at least one image based depth sensor. A robot 300 can move in a direction indicated by arrow 332 to a target destination zone 334 in front of the door 328. Upon reaching the target destination zone 328, deliveries held in a securable container 316, can be removed by a room occupant (not shown). In the particular embodiment shown, container 316 can be built into a top of the robot 300.

Sensor(s) 302 can be fixed or movably mounted near or at a top of the robot 300. In some embodiments, a key area to sense during obstacle avoidance can be the area directly in a movement path (e.g., 332) of the robot 300, particularly the area directly in front of the robot 300. Accordingly, in some embodiments, sensors 302 (including one or more depth sensors) can include one or more sensors that are directed generally downward or outward, with a field of view typically maintained to include an area into which the robot 300 is moving.

In some embodiments, sensor(s) 302 can include a depth camera that is mounted such that it points directly downward, with about half of its field of view (FOV) filled with a body of robot 300 while the remaining half can be used for obstacle detection. In some embodiments, a depth sensor within sensors 302 can be mounted out and down at an angle of up to FOV/2 from vertical to provide greater viewable area for obstacle detection.

In very particular embodiments, depth sensors can include components similar to, or derived from, video gaming technology, enabling three dimensional sensing. Such depth sensors can be more cost effective than wide FOV laser-based sensors employed in conventional systems. Very particular examples of possible sensors of this type can include, but are not limited to, the Kinect manufactured by Microsoft Corporation, Carmine by PrimeSense (now owned by Apple Computer), or DepthSense 325 by SoftKinetic. Such depth sensors can be more cost effective, and typically direct infrared light to bounce off objects and be captured by an image sensor in order to determine how far those objects are from the sensor; while further incorporating an video camera (such as an RGB video camera) to allow the depth image to be combined with the video image.

Compared to commonly available laser sensors, depth sensors included in a robot according to embodiments can have a much narrower field of view (typically less than 90°), a much shorter effective range of depth detection (around 1-3 meters), and often have a "dead zone" with limited or absent depth ranging within a half meter or so of the depth sensor.

According to some embodiments, mounting one or more depth sensors as described herein can overcome limitations associated with a typically narrow field of view and other limitations of such depth sensors. In certain embodiments, a depth sensor can be movable, with hinged, rail, hydraulic piston, or other suitable actuating mechanisms used to rotate, elevate, depress, oscillate, or laterally scan the depth sensor. In other embodiments, multiple depth sensors can be used and generally directed so that forward, backward, upward and downward regions are monitored. In certain embodiments, conventional RGB CMOS or CCD sensors can be used, alone or in combination with narrowband, wideband, polarization or other spectral filters. Embodiments can also include infrared, ultraviolet, or other imaging focal plane array devices to allow for hyperspectral image processing. This can allow, for example, monitoring and tracking of guides, markers, or pathways that are not visible, or not easily visible to people.

In some embodiments, ambient light such as sunlight, incandescent, halogen, LED, fluorescent or other commonly available artificial source may illuminate the environment in which a robot (e.g., 100, 300) moves, and depth sensors of the robot can use such light to detect objects/obstacles. In addition or alternatively, a robot can have one or more attached (movable or fixed) light sources to augment or serve as a light source for object/obstacle detection. Such light sources can augment ambient light intensity and/or provide wavelengths not available in the ambient light source and/or substitute for ambient light in dark environments.

If a robot (e.g., 100, 300) includes such light sources, the light sources may be mounted along with, or separately from, the depth sensors, and can include monochromatic or near monochromatic light sources such as lasers, light emitting diodes (LEDs), or organic light emitting diodes (OLEDs). In some embodiments, broadband light sources may be provided by multiple LEDs of varying wavelength (including infrared or ultraviolet LEDs), halogen lamps or other suitable conventional light source. Various light shields, lenses, mirrors, reflective surfaces, or other optics can provide wide light beams for area illumination or tightly focused beams for improved local illumination intensity.

Interaction with a robot (e.g., 100, 300) can be provided by local input or network interface. As but a few examples, local input can be through a user interface, such as a touchpad, by voice or gesture control, or by dedicated remote controllers. Local display of status, functionality, and error messages or the like may be afforded by a display, which can be a touchpad display. The display can be a conventional LCD display, a bistable displays (such electronic paper or similar), an OLED display, or other suitable display. Local user input can include a robot mounted pad, hard or soft keyboard, touch sensitive element (which may be integrated as part of the optional display), or similar, to provide for user input, voice control, or camera mediated user gestural control.

In certain embodiments, a wired or wireless connect subsystem can be used to connect to another user interaction device such as a laptop, tablet, or smart phone (not shown). Optionally, data and control signals can be received, generated, or transported between varieties of external data sources, including wireless networks, personal area networks, cellular networks, the Internet, or cloud mediated data sources. In addition, a robot (e.g., 100, 300) may include a source of local data (e.g. a hard drive, solid state drive, flash memory, or any other suitable memory, including dynamic memory, such as SRAM or DRAM) that can allow for local data storage of user-specified preferences or protocols.

In one particular embodiment, multiple communication systems can be provided. For example, a robot (e.g., 100, 300) can be provided with a direct Wi-Fi connection (802.11b/g/n), as well as a separate 4G cell connection provided as a back-up communication channel (e.g., such as that included on an interface tablet computer). Similarly, tablet or robot mounted Bluetooth or other local communication systems can be used to identify pre-positioned radio beacons, or to form a part of a user interface via a user smartphone or tablet.

According to embodiments, when a robot (e.g., 100, 300) autonomously moves to conduct a task, it can rely on localization for tracking its current position. A typical example of localization technologies is a simultaneous localization and mapping (SLAM) technique. Thus, a mobile robot (e.g., 100, 300) can use SLAM to detect information of surroundings of a work space where the robot conducts a task and process the detected information to construct a map corresponding to the work space while at the same time estimating its absolute position.

In certain embodiments, Bluetooth beacons, radio beacons, light emitting devices, and/or visible patterns can be placed at particular sites or objects to assist robot navigation.

In some embodiments, a robot (e.g., 100, 300) can carry a wide range of amenities and supplies in various optional lockers, shipping containers, or shelving units, including food and beverages. Some of these supplies (especially beverages) may spill or be damaged if the robot does not move smoothly and gently. Such a problem can be especially acute when the robot starts and stops, particularly during emergency stops (e.g., when someone jumps into its path). In one embodiment the robot (e.g., 100, 300) can be controlled to gently accelerate and decelerate, minimizing the forces felt by the payload. To enable such a response, a robot (e.g., 100, 300) can have a motor control system of sufficient fidelity for smoothly decelerate multiple motors (wheels) simultaneously. In a particular embodiments, a robot (e.g., 100, 300) can include a high-frequency (e.g. 1000 Hz) motor control loop system.

Referring still to FIG. 3, in operation, a robot (e.g., 100, 300) can detect a movable object 326, and plan a new path to avoid the object, or slow down or halt until the object 326 is no longer in the desired movement path 332 of the robot (e.g., 100, 300). Stationary objects 324-0/1 can be avoided according to a local movement plan. Stationary objects 324-0/1 can already be known, and verified by location detection, or newly detected by the robot.

Figure 4:
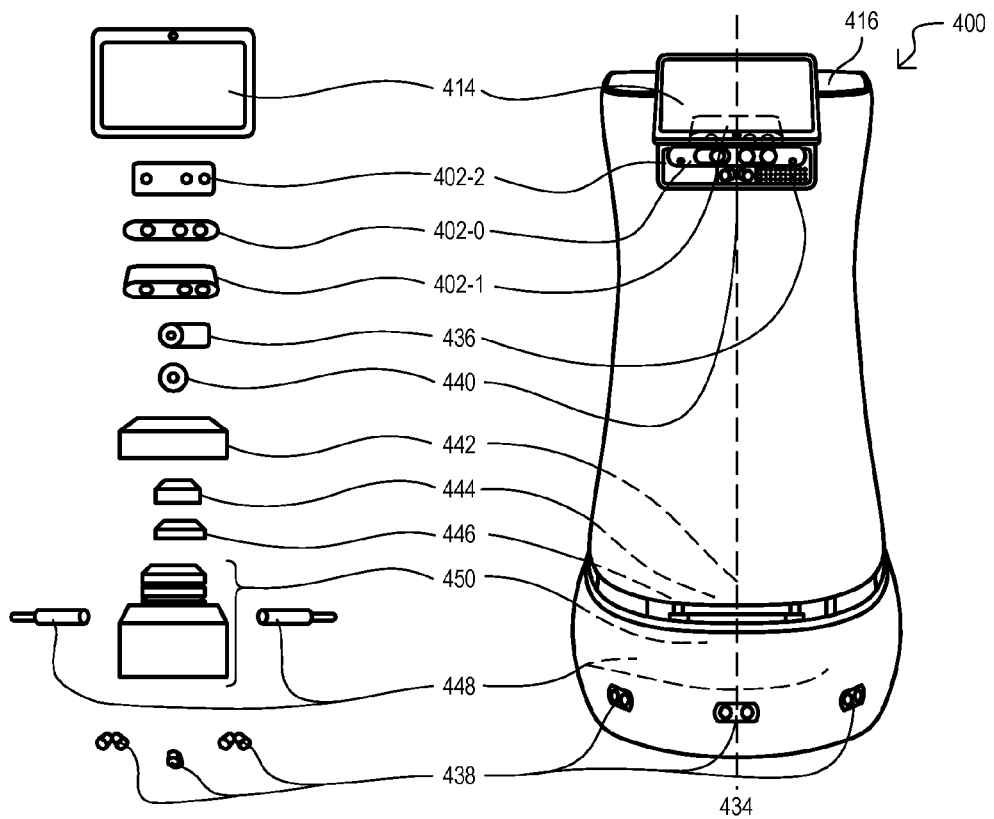
FIG. 4 shows a robot having multiple depth sensors mounted on a rotatable, generally cylindrical robot according to an embodiment.

FIG. 4 shows a robot 400 according to one particular embodiment, as well as selected components of the robot 400 in an exploded view. In some embodiments, robot 400 can be one very particular implementation of robot 100 shown in FIGS. 1A to 2C and robot 300 shown in FIG. 3.

A robot 400 can have a generally cylindrical shape about a vertical midline 434. Advantageously, this shape simplifies movement calculations and simplifies rotation in place, since position and potential interactions of objects with extending arms or the like do not have to be determined. A touch tablet computing device (tablet) 414 can be included for user input and/or messaging, and can be mounted at the top of the robot at an angle convenient for viewing and user input. In addition to a visible display, tablet 414 can be used for speech input/output, and/or for processing and controlling the robot 400.

In some embodiments, a speaker 436 separate from the tablet 414 can also be included for providing audible instructions or notices.

In some embodiments, a storage container 416 can be included within a body 404 of the robot, positioned behind the tablet 414. A storage container 416 can be securable. In particular embodiments, storage container 416 is lockable, and can be controlled to unlock for delivery to a recipient only when a destination has been reached and authorization to unlock is received.

In the embodiment of FIG. 4, robot 400 can support multiple fixed depth sensors, including a forward looking depth sensor 402-0 and a downward looking depth sensor 402-1 mounted adjacent to each other. In the disclosed embodiment, the depth sensors (402-0/1) can be fixedly mounted in a manner that does not require a turret or movable actuators. In particular embodiments, each depth sensor 402-0/1 can include a beam emitting device and an image sensor that detects the beam as it reflects off of objects. In a very particular embodiment, depth sensors 402-0/1 can include an IR emitter and IR image sensor, such as an IR video camera. In some embodiments, a robot 400 can include a video camera 402-2 to provide additional imaging capabilities. In very particular embodiments, a video camera 402-2 can be an RGB CMOS type video camera.

In addition to depth sensors, a robot 400 can include one or more other sensors. Referring still to FIG. 4, a robot 400 can further include a base mounted sonar array 438 and a wide angle sonar 440 mounted near a top of the robot 400.

A robot 400 can be controlled by one or more processors executing stored instructions that can be responsive to sensor inputs and/or transmitted inputs. In a particular embodiment, an x86 or similar central processing unit 442 can be used in conjunction with one or more microcontrollers 444 and motor controllers 446 for local control of movement of the robot 400.

In the embodiment shown, differential drive motors 448 powered by batteries 450 can provide movement by driving wheels (not shown) that support the robot 400. In particular embodiments, batteries 450 can be lithium ion or some other battery type, with rechargeable battery systems being preferred. A drive mechanism can include separate drive motors 448 each attached to its own wheel, in a differential drive configuration. In some embodiments such a drive mechanism can allow for a robot velocity of 1.5 meters/second, and the ability to move up and down ramps, as well as on level ground. In a particular embodiments, a robot 400 can include two drive wheels between 4-8 inches in diameter, preferably about six inches in diameter.

According to embodiments, a robot 400 can be sized to have a height of between 0.8 to 2 meters, preferably between 1.2 to 1.5 meters, and a diameter of between 30-60 centimeters, preferably between 40-50 centimeters. Such physical dimensions can enable robot 400 to easily move through hallways and doorways.

Figure 5A:
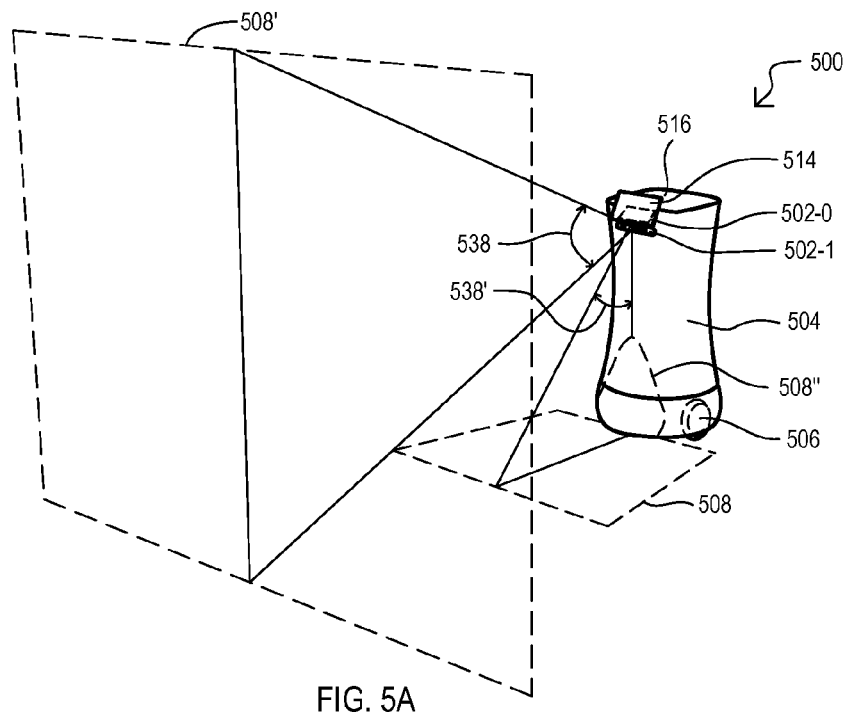
FIGS. 5A and 5B show fields of view of robots according to embodiments.
Figure 5B:
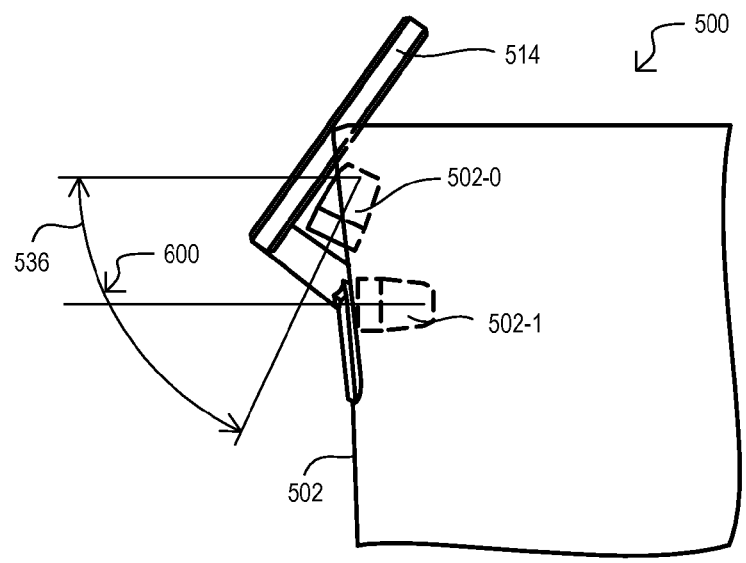

FIGS. 5A and 5B are diagrams showing depth sensing field of view configurations according to embodiments. Such field of view configurations can be included in any of the robots described herein.

FIG. 5A is a perspective view showing a robot 500 and two corresponding fields of view 508 and 508'. FIG. 5B is a side view showing a top portion of the robot 500. In the embodiment shown, a robot 500 can have two depth sensors 502-0/1 fixedly mounted near a top of the robot 500. Depth sensors 502-0/1 can be any suitable depth sensor, but in particular embodiments, can include an emitting device and image sensor as described herein, or an equivalent. In some embodiments, one or both depth sensors 502-0/1 can include an RGB CMOS type video camera. In the embodiment shown, depth sensors 502-0/1 can be positioned adjacent to each other. In some embodiments, depth sensors 502-0/1 can be within a few centimeters of one another. In some embodiments, both depth sensors 502-0/1 can produce color images with corresponding depth information. That is, both depth sensors 502-0/1 can include video cameras.

Depth sensors 502-0/1 can be mounted at the top of the robot 500 facing the forward traveling direction of the robot (i.e., the front). In one particular embodiment, depth sensors 502-0/1 can be mounted 80 cm to 85 cm above the floor. One depth sensor 502-1 can be pointed directly ahead, while the other depth sensor 502-0 can be angled downward to image the floor directly ahead of the robot. Such an angle is shown as 536 in FIG. 5B. In a very particular embodiment, such an angle can be between 50° and 80° in the vertical direction, preferably between 60° and 70°, and in one very particular implementation, about 65°. A vertical field of view angle for each depth sensor 502-0/1 is shown as 538 and 538' in FIG. 5A. In some embodiments, such field of view angles can be less than 180°, in other embodiments such angles can be less than 90°, and in further embodiments less than 60°. In one very particular embodiment, a field of view for each depth sensor 502-0/1 can be 57° in the horizontal direction and 45° in the vertical direction.

Referring still to FIG. 5A, in some embodiments, a near edge of the field of view 508 for a downward pointed depth sensor 502-0 can intersect a lower portion of the robot body 504 (i.e., the base). This is represented in FIG. 5A by the pear-shaped dashed line 508" on the front of the robot 500 that shows the edge of the field of view 508 as it intersects the curved body 504 of the robot 500. The trapezoid shape 508 on the floor in front of the robot shows the area visible to the downward facing depth sensor 502-0. The vertical trapezoid 508' in front of the robot 500 shows the area visible to the forward facing depth sensor 502-1.

The robot 500 of FIGS. 5A and 5B can also include a movement system 506, user I/F 514, or storage container 516 according to any of the embodiments described herein, or equivalents.

Figure 6:
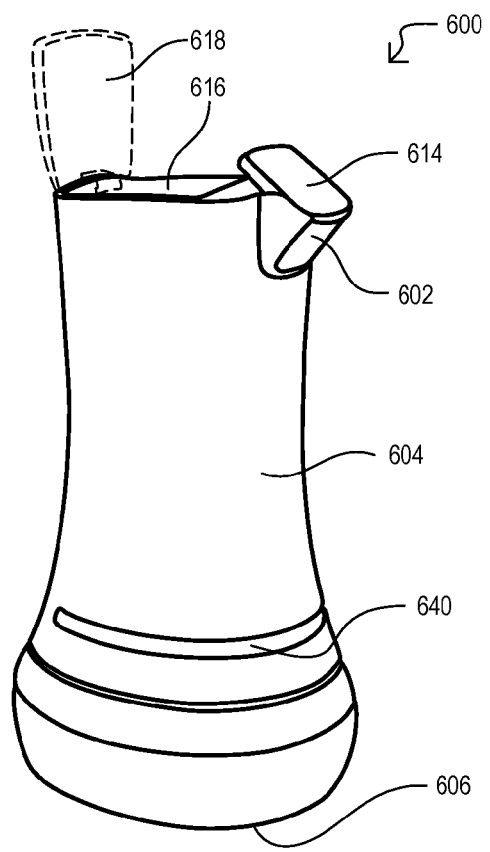
FIG. 6 is a perspective view of a robot according to an embodiment.

Referring to FIG. 6, a robot 600 according to a further embodiment is shown in a perspective view. A robot 600 can have a body 604 with a generally cylindrical or elongated shape. One or more depth sensors 602 can be mounted on an upper portion of the body 604 to enable downward and/or forward facing depth sensors. Depth sensors 602 can have any of the configurations and/or components described for embodiments herein, or equivalents. A robot 600 can include a user I/F 614 also mounted on an upper portion of body 614. In one embodiments, user I/F 614 can be a tablet computing device with a touchscreen. A robot 600 can include a storage container 616, which in the embodiment shown, can extend into a top surface of the robot body 604. In the embodiment shown, a storage container 616 can be securable, including a door/lid 618 which can be closed. In particular embodiments, door/lid 618 is lockable and can be unlocked and/or opened upon authentication in a delivery operation.

A robot 600 can include additional body mounted items 640, which can include, but are not limited to, lighting structures to provide notification lighting, lighting for use by sensors 602, or one or more additional sensors.

Figure 7A:
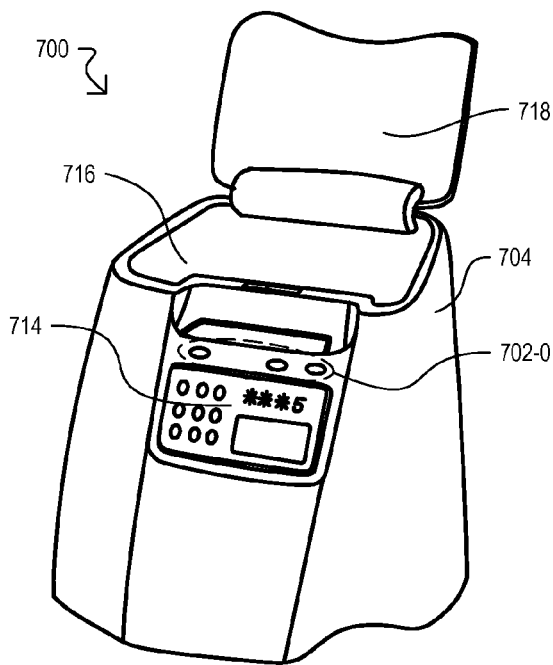
FIGS. 7A to 7C are diagrams showing a robot with a lid which can be lockable, according to an embodiment.
Figure 7B:
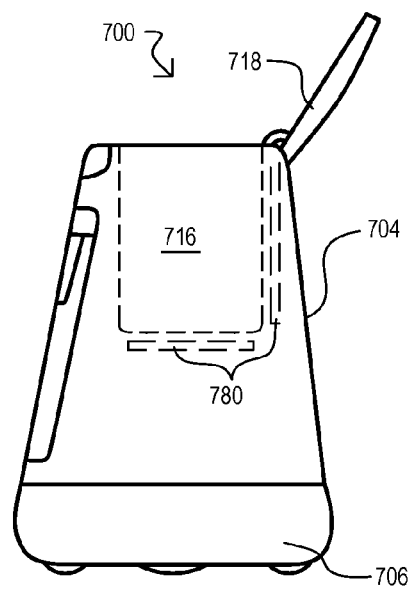
Figure 7C:
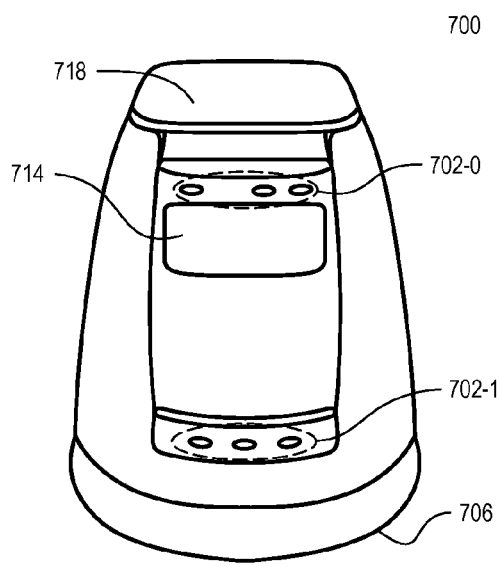

FIGS. 7A to 7C are a series of views showing a robot 700 according to another embodiment. A robot 700 can include a container (cargo space) 716 with a lid 718 that can be locked. FIG. 7A is a partial perspective view of the robot with the lid 718 open. FIG. 7B is a side view with the lid 718 open. FIG. 7C is an angled front view with the lid 718 closed.

In some embodiments, a lid 718 can be transparent to allow inspection of any cargo stored within container 716. In the illustrated embodiment, the lid 718 is roughly rectangular, and has a slight flattened dome curvature that can limit or prevent the ability of a stacking of items on the robot 700, rather than placing items in the designated cargo space 716.

According to embodiments, a lid 718 can be hinge attached. In some embodiments, a lid 718 can be spring loaded or provided with actuators to ensure closure. A lid 718 can be oriented so that a user facing the robot 700 can easily lift the lid 718 (for example, after the lid has been unlocked).

According to embodiments, a robot 700 can include one or more container sensors 780. Container sensors 780 can indicate any of: the presence of one or more objects in the container 716; the placing of one or more objects in the container 716; the absence of objects in the container 716;

or the removal of one or more objects from the container 716. Container sensors 780 can include, but are not limited to: RFID sensors to detect RFID tags attached to cargo, a pressure, weight or similar sensor, or image sensors.

When all or designated item(s) of cargo have been removed from a container 716, a robot 700 can activate an indicator, such as a visible indicator (light) and/or audio indicator. In addition or alternatively, a robot can include a user interface 714 to inform a user that cargo items have been delivered and to close (or allow closure) of the lid. In the embodiment shown, a user interface 714 can be integrated into a front surface of a body 704, being flush with, or extending only a small amount above, the surrounding body surface.

As shown in FIGS. 7A to 7C, a robot 700 can further include top located sensors 702-0, lower sensors 702-1, and a movement system 706 located within a body 704 of the robot 700.

Figure 8A:
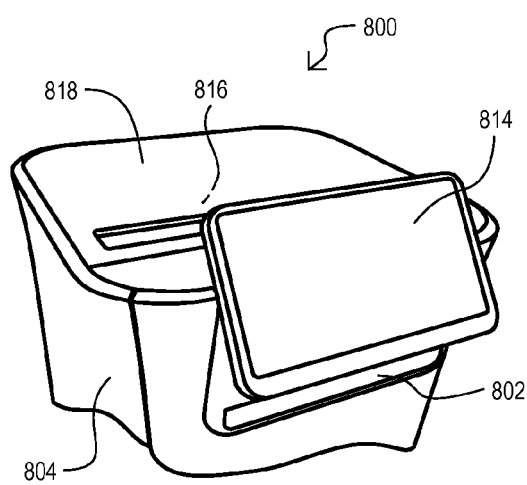

FIGS. 8A and 8B illustrate delivery robots 800/800' that can include a touchpad user interface 814/814' and a top loading container (cargo bay) 816/816' to hold items. A containers 816/816' can include a lid 818/818' which can form all or a portion of a top surface of a body 804/804'. In some embodiments, a lid 818/818' can be opaque to prevent viewing of cargo bay 816/816' contents. A user interface 814/814' can be mounted near a top of the delivery robot 800/800', and can be used to provide indication of the current task (e.g., "running a delivery"). When the robot 800/800' reaches a desired cargo recipient, a user interface 814/814' can indicate the recipient and authenticating information (e.g. "Delivery for Mr. Smith, Room 142"). In some embodiments, a lid 818/818' can be unlocked to permit withdrawal of cargo from the top loading cargo bay 816/816'.

FIG. 9 is a rear view (a view which shows the portion of the robot that is typically opposite to a direction of travel) of a robot 900 according to an embodiment. A robot 900 can include multiple rear positioned containers 982-0 to 982-3. In the particular embodiment shown, containers (982-0 to 982-3) can be vertically stacked with respect to one another. Rear containers (982-0 to 982-3) can include, but are not limited to, shelves, drawers and/or bins formed/situated within an interior of a robot body 904.

In some embodiments, such rear containers (982-0 to 982-3) can be in addition to a top loading securable container 916. In such embodiments, a lid 918 can cover a top loading container 916. A lid 918 can be lockable or not lockable.

In some embodiments, rear containers (982-0 to 982-3) can include shelves with structures that are not locked, and can typically be used to transport low value items. For example, fresh towels, blankets, robes, or pillows can be delivered to a room. In another usage scenario, rear containers (982-0 to 982-3) can be loaded with complimentary breakfast items or newspapers to be delivered to every occupied hotel room in the morning. In still other embodiments, rear containers (982-0 to 982-3) can be used to transport unwanted items such as dirty dishes back to an on-site restaurant facility.

It is understood that while FIG. 9 shows a robot 900 with rear positioned containers, alternate embodiments can include side positioned containers (containers formed in a surface that is at an angle to a direction of travel). Further, while FIG. 9 shows four containers, alternate embodiments can include a smaller number of containers, including but one container. In some embodiments, containers are adjustable, having moveable parts, or multiple matings/fitting to enable a variable number of containers and/or containers of differing sizes.

FIGS. 10A to 10O are views showing a robot 1000 according to a further embodiment. FIG. 10A is a perspective angled view of robot 1000 with a lid 1018 closed. FIG. 10B is a partial side view of robot 1000 with a lid 1018 opened. FIG. 10O is a perspective rear view of robot 1000 with a lid 1018 closed.

Figure 10C:
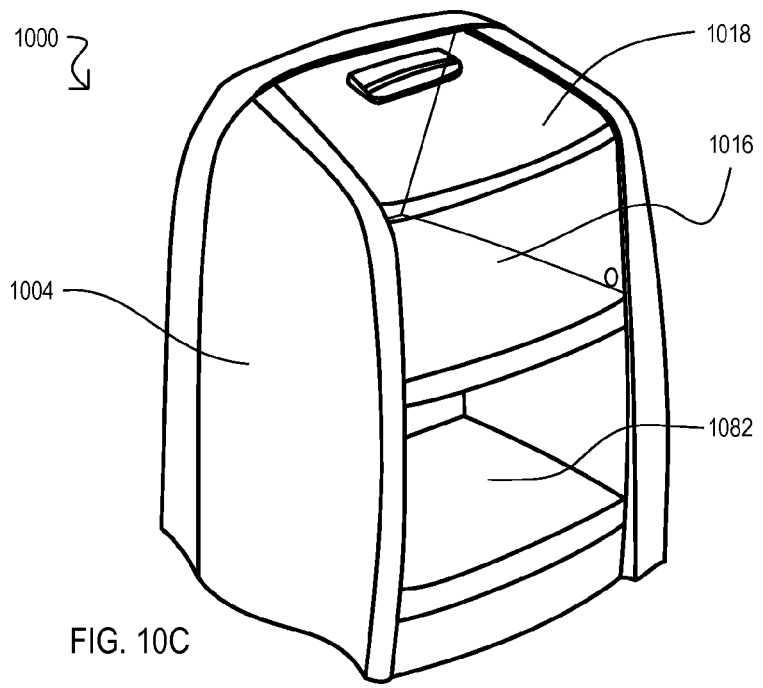
FIGS. 10A to 10O are diagrams showing a robot having a top and a rear cargo bay according to an embodiment.

FIGS. 10A to 10O show a delivery robot having a large top loading cargo container 1016 with a contoured lid 1018 which can extend along a top and partially down a rear of a robot body 1004. A robot 1000 can also include one or more large modular shelves (one shown as 1082 in FIG. 10C) accessible from a rear of the robot 1000. The modular shelves (e.g., 1082) can be open, or configured to accept locking or non-locking structures (e.g., drawers, bins, etc.). In certain embodiments, the modular shelves can be used to hold objects that can augment robot functionality, including, but not limited to, additional batteries or other power sources that can extend robot range and working duration.

As shown in FIGS. 10A and 10B, a robot 1000 can also include sensors 1002-0 to 1002-2, a user interface 1014, and a movement system 1006. Such structures can be according to any of the embodiments described herein, or equivalents.

Figures 11A, 11B:
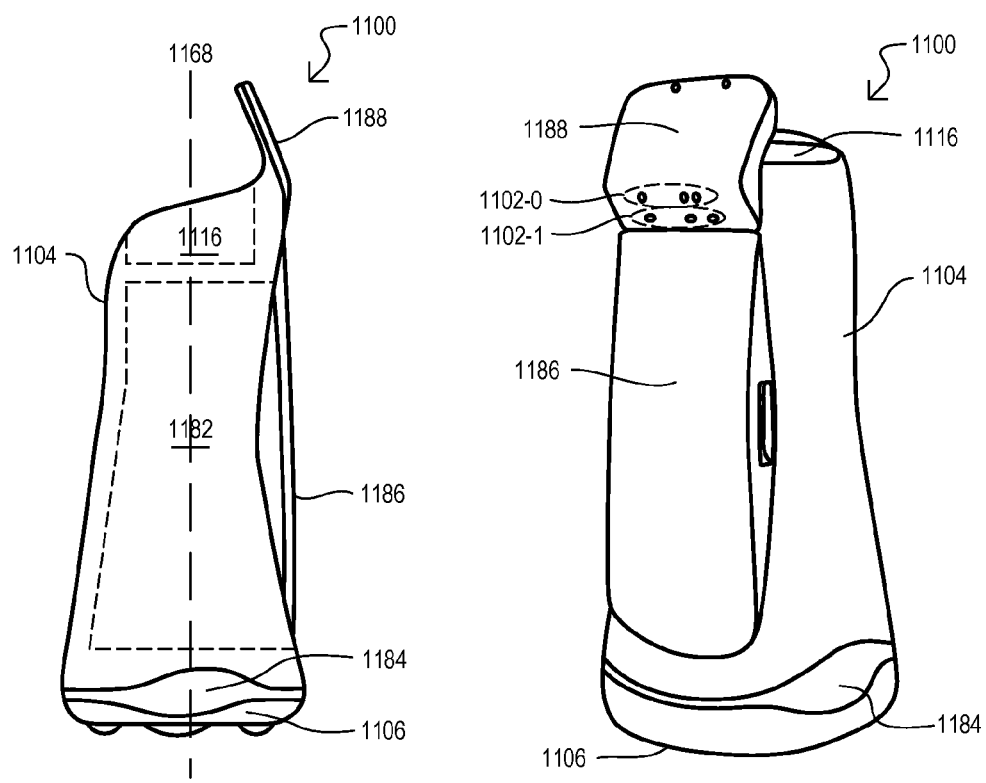
FIGS. 11A and 11B are diagrams of a robot having top and front cargo bays according to an embodiment.

FIGS. 11A and 11B are diagrams showing a robot 1100 according to another embodiment. FIG. 11A is a side view and FIG. 11B is an angled front view. A robot 1100 can have a both a top cargo bay 1116 and a front cargo bay 1182. A door 1186 can be opened to access front cargo bay 1182. In some embodiments, a door 1186 can be lockable. A top cargo bay 1116 may have a lid, or may not have a lid.

A robot 1100 can include protective bumpers to prevent the robot from being damaged, or damaging other objects in the event of a collision. In the embodiment of FIGS. 11A/B, bumpers 1184 are provided at a base of the robot. A movement system 1106 can also be included within the base.

In the embodiment shown, a robot body 1104 can be smoothly contoured, and includes an extension 1188 for holding a user interface (e.g., tablet). Extension 1188 can hold a user interface for easy access by a user, while being angled backward over the robot casing to protect the user interface from collision. Advantageously, the position of the angled user interface near a robot vertical midline can also reduce off axis weight distribution issues that could arise from a differently positioned user interface.

As shown in FIGS. 11A and 11B, a robot 1100 can also include sensors 1002-0 to 1002-2. Such sensors can be according to any of the embodiments described herein, or equivalents.

Figures 12A, 12B:
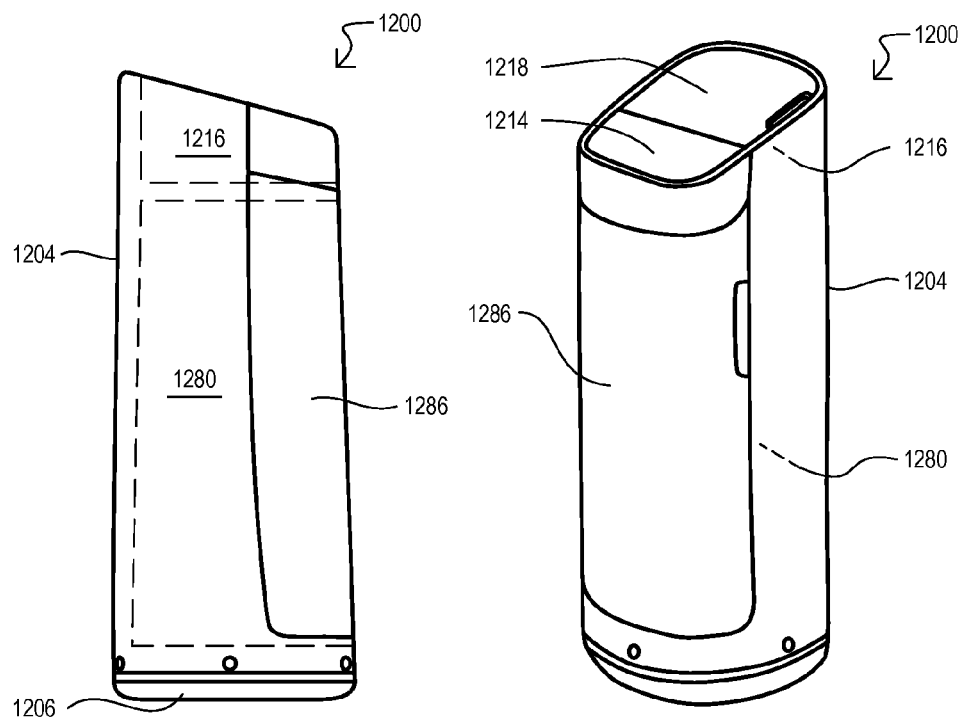
FIGS. 12A and 12B are diagrams of a robot capable of internal storage of large items according to an embodiment.

FIGS. 12A and 12B are diagrams of a delivery robot 1200 according to another embodiment. A robot 1200 can be capable of storing relatively large items. A robot 1200 can have a large front cargo area 1280 that can be accessed via a door 1286. In some embodiments, a door 1286 can be hinged door to swing open. A door 1286 can be lockable or not lockable.

A robot 1200 can also have a top cargo area 1216 in addition to a front cargo area 1280. In the embodiment shown, a lid 1218 can cover top cargo area 1216 and can open sideways rather than toward a rear of the robot 1200.

A user interface 1214 (e.g., touch screen) can be mounted at the top of body of the robot 1200. In the embodiment shown, user interface 1214 can be integrated into a top surface. User interface 1214 can have a pronounced forward tilt to ease user interaction with both the user interface 1214 and the top loading cargo area 1218. As with the robot configuration of FIGS. 11A and 11B, due to the mounted position, a user interface 1214 can be better protected from damage by contact with external objects, and is positioned closer to the delivery robot vertical midline to improve stability.

Figure 13:
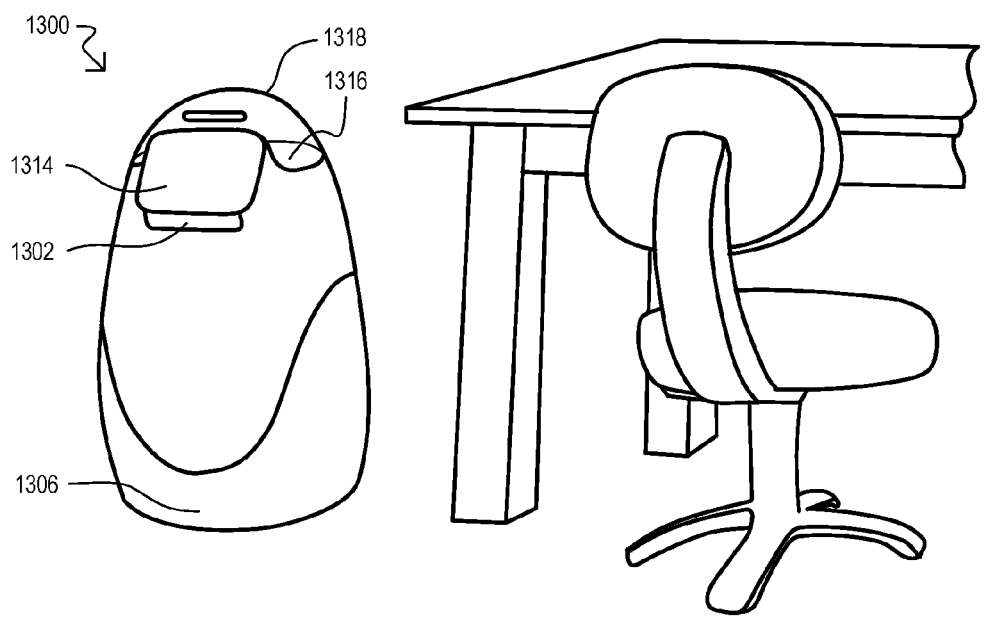
FIG. 13 shows a desk height sized robot according to an embodiment.

FIG. 13 is a diagram showing a robot 1300 according to another embodiment. A robot 1300 can be a relatively smaller in height, such as a desk height in some embodiments. A robot 1300 can have a height less than 100 cm, in some embodiments less than 90 cm, and less than 70 cm. FIG. 13 also shows a robot 1300 with an integral, forward facing user interface 1314.

In the embodiment of FIG. 13, a robot 1300 can have a domed top lid 1318 that covers a container 1316, and can be particularly useful for carrying small quantities of mail, paper, or files in an office environment.

As shown in FIG. 13, a robot 1300 can also include one or more sensors 1302 and a movement system 1306. Such structures can be according to any of the embodiments described herein, or equivalents.

Figure 14:
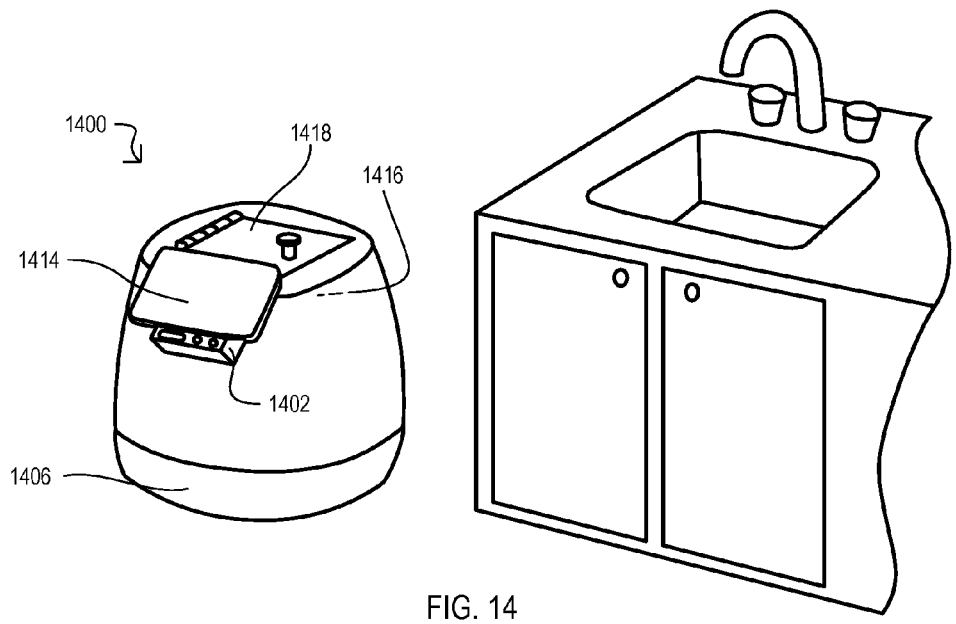
FIG. 14 shows a small delivery robot with a vertically accessible lidded cargo space according to an embodiment.

FIG. 14 is a diagram showing a robot 1400 according to another embodiment. A robot 1400 can be a small height robot, having a height less than 70 cm. A robot 1400 can be even smaller than the desk height sized delivery robot of FIG. 13. Such a low height can provide for increased stability. In certain usage scenarios, such small height robots can effectively be used to guide a user to a desired location (e.g., room or other locality), as well as to deliver small items such as razors or other toiletries.

As shown in FIG. 14, a robot 1400 can also include a top accessed container 1416 with corresponding lid 1418, sensors 1402, a user interface 1414, and a movement system 1406. Such structures can be according to any of the embodiments described herein, or equivalents.

While embodiments have included robots with containers from which items can be placed and removed by users or other actors, other embodiments can include mechanisms for delivering objects from a container, mechanisms for pulling objects into a container, or both.

Figure 15:
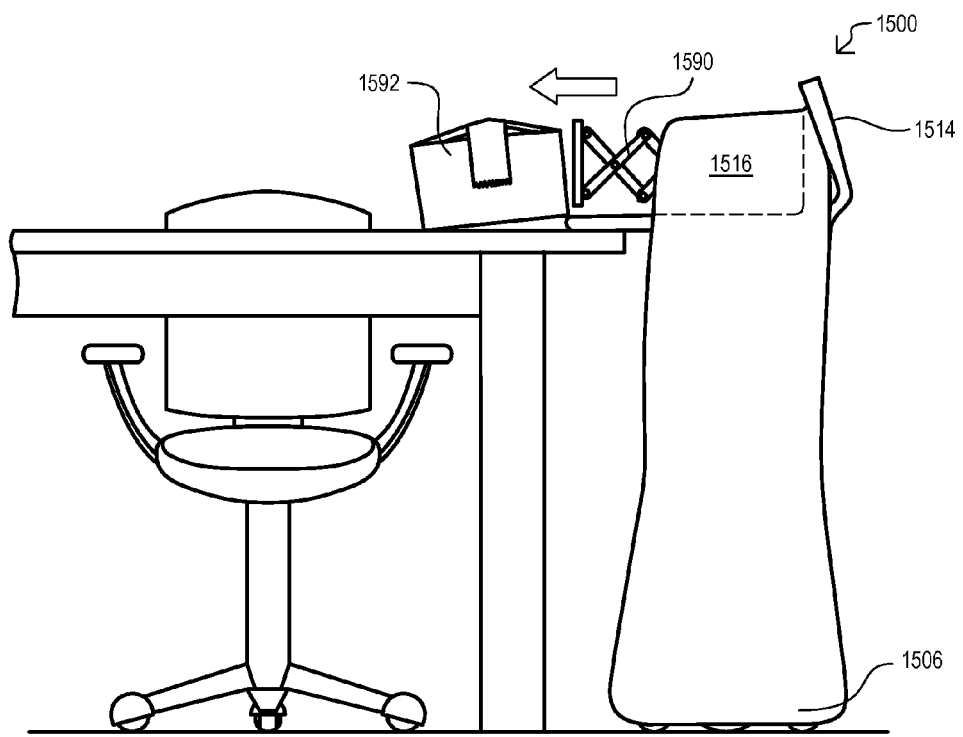
FIG. 15 shows a robot with a delivery mechanism according to an embodiment.

FIG. 15 is a diagram showing a robot 1500 with a delivery mechanism 1590 to deliver packages. In the embodiment shown, a delivery mechanism 1590 can include a pusher arm to deliver packages (e.g., 1592) from a container 1516 within the robot 1500.

In some embodiments, a robot 1500 can carry small quantities of items (e.g., mail, paper, or files in an office environment) while having an added advantage of being able to autonomously complete deliveries if no one is able to pick-up the delivered package. As will be understood, alternative embodiments can include any suitable delivery mechanism, including but not limited to piston actuators, ramp raising mechanisms, vibratory mechanisms, tracked or roller mechanisms, or the like.

As shown in FIG. 15, a robot 1500 can also include a user interface 1514 and a movement system 1506. Such structures can be according to any of the embodiments described herein, or equivalents.

Figure 16:
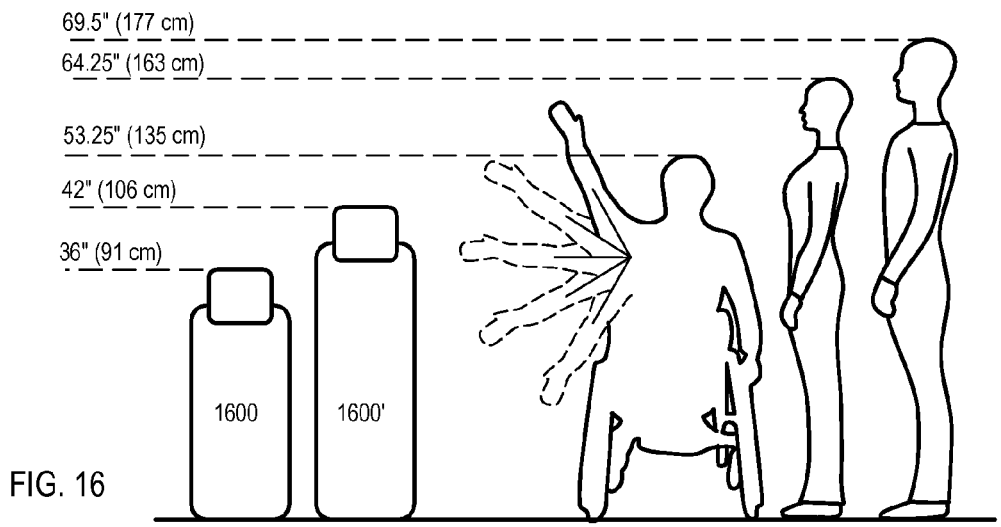
FIG. 16 is a diagrams showing robot height dimensions according to embodiments.

FIG. 16 is a diagram showing suitable robot height dimensions according to embodiments. FIG. 16 shows a robot 1600 having a height of about 91 cm and another robot 1600' having a height of about 106 cm. As shown by various user heights (177 cm, 163 cm and 135 cm), robots within the given height range (about 91 cm to about 106 cm) can allow for ease in interaction with users, and are not likely to be overlooked, due to their size. Additionally, robots of such size are able to easily navigate in human navigable environments.

Figure 17:
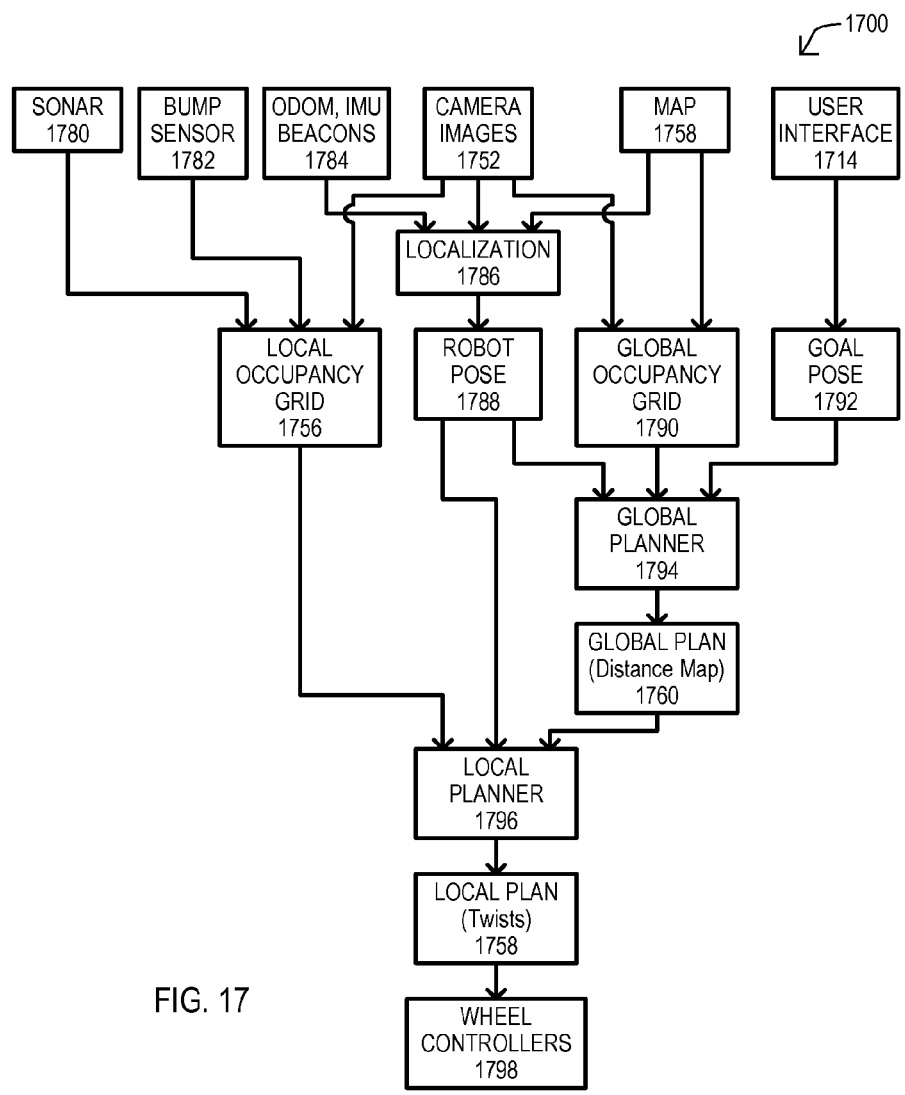
FIG. 17 is a flow diagram illustrating data processing steps for obstacle avoidance and navigation of a robot according to embodiments.

FIG. 17 is a flow chart illustrating process steps 1700 for autonomous robot navigation according to an embodiment. In FIG. 17, a robot can navigate through an environment with variously positioned movable and non-movable items, as well as a target destination.

Referring to FIG. 17, a sensor suite of a robot can include one or more sonars 1780, one or more bump sensors 1782, and any of odometers, inertial measurement units (IMU), or other sensors configured to work with beacons, including beacons that emit light or radio signals (represented by 1784). A sensor suite can also include one or more camera systems 1752 capable providing video or multiple still images. Camera systems 1752 can include those described herein with an emitter and image sensor. Such systems may or may not include other cameras, such as RGB type video cameras.

Sensor data from the camera images (1752) and/or odometers and position beacons (1784) can be used to localize a position of the robot 1786. In some embodiments, map data 1758 can also be used in localization (1786). Localization 1786 can be used to arrive at a robot pose 1788, which can include the robot's position and orientation in a local environment. In the embodiment shown, sensor data from the camera images (1752), sonar(s) 1780 and bump sensor(s) can provide local knowledge of object positions in the environment around the robot (local occupancy grid) 1756.

Data from the sensor suite (e.g., 1752) in combination with map data 1758 can be used to arrive at a global occupancy grid 1790.

In the embodiment shown, a user interface 1714 can be used to enter/receive data that indicates a destination for the robot. Such data can be used to arrive at a goal pose 1792, which can include the position of a target destination. In some embodiments, such a user interface data can be used in conjunction with map data 1758 to arrive at a goal pose 1792.

A given robot pose 1788, goal pose 1792 and global occupancy grid 1790 can be used by a global planner 1794 to generate a global plan (distance map) 1760. In some embodiments, map data can be used with a global occupancy grid that integrates known positions of objects in the mapped area, and in conjunction with robot pose input and the goal pose, a robot global plan 1760 for navigation can be generated. The global plan 1760 can be reduced to a distance map.

Referring still to FIG. 17, a local planner 1796 can combine a global plan 1760 with integrated data of local object positions from the local occupancy grid 1756 and the robot pose 1788. With such data, a local planner 1796 can adjust the local plan to avoid or go around blockages or obstructions in the robot path. Local sensing and re-orientation of the robot (twists) 1758 can verify local paths, and provide control input to the wheels (1798) for partial or full rotation of the robot, or backward or forward movement that avoids objects or people while traveling to a desired destination.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that other embodiments of this invention may be practiced in the absence of an element/step not specifically disclosed herein.

What is claimed is:

1. A mobile robot, comprising:
an elongated body disposed in a vertical direction and having an approximately cylindrical shape;
a user interface within an upper 20 centimeters of the body and inclined to be accessible from above and in front of the robot;
at least one depth sensor that is mounted at or near a top of the body and having at least one field of view;
at least one container formed within the body that includes a lid actuated by the robot; and
a drive mechanism disposed within the body.

2. The mobile robot of claim 1, wherein:
the user interface comprises a touchscreen.

3. The mobile robot of claim 1, wherein:
the at least one container is accessible from a top of the robot.

4. The mobile robot of claim 1, wherein:
the lid opens in a direction away from the user interface.

5. The mobile robot of claim 1, wherein:
the lid is electronically securable.

6. The mobile robot of claim 1, wherein:
the robot travels on a surface, and
the at least one field of view includes at least a portion of a first meter of the surface in the robot's direction of travel.

7. The mobile robot of claim 6, wherein:
the at least one field of view further includes a space directly in front of the robot in the robot's direction of travel.

8. The mobile robot of claim 1, wherein:
the at least one container is formed within a top of the robot and the lid is electronically securable lid and opens in a direction away from the user interface; and
the robot has a center of gravity below a vertical midway point of the robot when the at least one container is empty.

9. A mobile robot, comprising:
an elongated body having a height between 0.5 and 2 meters and width no greater than a meter;
at least one depth sensor proximate a top of the body;
a user interface proximate or on the top of the body;
at least one container formed in the top of the body; and
a drive mechanism disposed within the body; wherein
the at least one container includes a lid that is actuated by the robot.

10. The mobile robot of claim 9, wherein:
the lid opens in a direction away from the user interface.

11. The mobile robot of claim 9, wherein:
the lid is electronically securable.

12. The mobile robot of claim 9, wherein:
the user interface is accessible from a front of the robot; and
the lid includes a hinge at a back of the robot; wherein the front of the robot faces the robot's direction of travel.

13. The mobile robot of claim 9, wherein:
the body has a rounded shape in cross section;
the user interface is inclined to be accessible from above and in front of the robot;
the at least one container is accessible from a front of the robot, where the user interface is accessed, and the lid is electronically securable;
the at least one depth sensor has at least one field of view that includes at least a portion of a first meter of a surface on which the robot travels; and
the robot has a center of gravity below a vertical midway point of the robot when the at least one container is empty.

14. A mobile robot, comprising:
an elongated body with a generally round cross section;
at least one depth sensor;
a user interface proximate a top of the body;
at least one container formed within the body that includes a lid actuated by the robot; and
a drive mechanism disposed within the body; wherein
the robot has a center of gravity below a vertical midway point of the robot when the at least one container is empty.

15. The mobile robot of claim 14, wherein:
the robot has a center of gravity below a vertical midway point of the robot when storing objects in the at least one container that weighs no more than ¼ the weight of the robot.

16. The mobile robot of claim 14, wherein:
the at least one container is formed in a top of the robot.

17. The mobile robot of claim 14, wherein:
the user interface comprises a touchscreen.

18. The mobile robot of claim 14, wherein:
the user interface is disposed within an upper 20 centimeters of the body and inclined to be accessible from above and in front of the robot.

19. The mobile robot of claim 14, wherein:
the body has a rounded shape in cross section;
the user interface is inclined to be accessible from above and in front of the robot;
the at least one container is accessible from a front of the robot where the user interface is accessed, and includes an electronically securable lid;
the at least one depth sensor has at least one field of view that includes at least a portion of a first meter of a surface on which the robot travels; and
the robot has a center of gravity below a vertical midway point of the robot when the at least one container is empty.

* * * * *